PROCESS FOR PREPARATION OF A POLYESTER POLYMER

Malcolm H. Shatz, Tonawanda, Raymond R. Hindersinn, Lewiston, and William F. Zimmer, Jr., Elnora, N.Y., assignors to Hooker Chemical Corporation, Niagara Falls, N.Y., a corporation of New York
No Drawing. Filed Apr. 24, 1964, Ser. No. 362,467
Int. Cl. C08g 17/08
U.S. Cl. 260—47                9 Claims

ABSTRACT OF THE DISCLOSURE

A method is provided for producing a high molecular weight polymer by reacting a difunctional aliphatic modifier and an excess of an organic diacid halide to produce a prepolymer, and thereafter reacting said prepolymer anhydrously at an elevated temperature with a bisphenol. Optionally, the latter portion of the process can be conducted in a vented extruder at elevated temperature under vacuum. The polymers resulting from the process of the invention have melt viscosities suitable for molding applications, and are produced more simply and in greater yields than by previous processes for preparing these polymers.

---

This invention relates to thermoplastic polymers and more particularly to linear thermoplastic polymer molding compounds wherein one of the reactants is a bisphenol derivative. The invention further relates to a process for preparing such polymers.

High molecular weight linear polycarbonate compositions based on bisphenols have been shown to be useful in the preparation of films, fibers and molded products. When bisphenols are reacted with aromatic dicarboxylic acid halides to form high molecular weight polyesters, the products often have such high softening temperatures that they cannot be fabricated by conventional techniques and some even decompose at temperatures below the softening or melting point of the polymer. It has been previously found that intractable polybisphenol esters can be converted into useful tractable polymers by modification with an aliphatic difunctional modifier, e.g., glycol. Such polymers were suitable molding compounds. However, they have been prepared by an interfacial condensation technique which involves considerable processing to recover the polymer and therefore is inconvenient.

Although the field of polymer chemistry is highly developed and continually rapidly expanding, the present process is novel and represents an advance over previously known art. The art teaches that high molecular weight polyesters can be prepared by reaction of an ester of an aromatic dicarboxylic acid with a glycol or bisphenol at elevated temperatures in the presence of a suitable catalyst. The literature also teaches that aromatic diols such as bisphenols tend to decompose in the presence of halogen containing acids at elevated temperatures. Polyesters of aromatic dicarboxylic acids and aliphatic glycols can be prepared by the reaction at elevated temperatures of the diacid chloride and glycol. It is known that bisphenol polyesters can be prepared by the reaction at ambient temperature of an aromatic diacid chloride dissolved in a water immiscible organic solvent, with an aqueous alkaline solution of the bisphenol, with catalytic amounts of a quarternary ammonium salt present. However, this latter method is not usually employable to copolymerize an aliphatic glycol into the polymer because of inability of the glycol to react under the polymerization conditions.

It is an object of this invention to provide an improved method for preparing linear thermoplastic bisphenol polyester polymers. Other objects will become apparent to those skilled in the art upon reference to the following detailed description and the examples.

In accordance with this invention there is provided a method of making a high molecular weight polymer by reacting a difunctional aliphatic modifier and an excess of a diacid halide to produce a prepolymer mixture and thereafter reacting said prepolymer mixture anhydrously at an elevated temperature with a bisphenol. The resulting novel polymers have melt viscosities suitable for molding applications and are obtained more simply and in greater yields than by the previous process for preparing these polymers.

The high molecular weight linear thermoplastic polymers of the present invention have an intrinsic viscosity of at least 0.4 deciliter/gram (dl./g.) and in most cases above 0.6 dl./g., measured in a solution of symmetrical tetrachloroethane at 30 degrees centigrade. The polymer contains esterified residues of aliphatic modifiers and bisphenols whose total mole percent is approximately equal to that of the mole percent of the diacid halide residue contained in the polymer.

The bisphenols considered useful for the preparation of high molecular weight polyesters according to the present invention correspond to the following general formula:

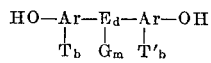

wherein Ar is aromatic preferably containing 6 to 18 carbon atoms (including phenyl, biphenyl and naphthyl) G is selected from the group consisting of alkyl, aryl, haloaryl, haloalkylaryl, alkylaryl, cycloalkyl, cyclohaloakyl, and haloalkyl, and suitably contains 1 to 12 carbon atoms; E is a bivalent (or disubstituted) radical selected from the group consisting of alkyl, haloalkyl, cycloalkyl, cyclohaloalkyl, alkylaryl, and haloalkylaryl, and preferably contains 1 to 12 carbon atoms; T and T' are independently selected from the group consisting of halogens, G' or OG' wherein G' is selected from the same group as G, chlorine and bromine being preferred halogens; $m$ is from zero to the number of replaceable hydrogen atoms on E; $b$ is from zero to the number of replaceable hydrogen atoms on Ar; and $d$ is from zero to 1. When there is a plurality of G, G', T and T' substituents in the bisphenols according to the above formula, these substituents may be the same or different. The T and T' substituents may occur in the ortho-, meta-, or para-position with respect to the hydroxyl radical. Additionally, mixtures of the above described bisphenols may be employed to achieve a polymer with especially desired properties.

Bisphenols having the above general formula and which are suitable for being applied according to the present invention include, but are not limited to bis(4-hydroxyphenyl)methane, bis(3-methyl-4-hydroxyphenyl)methane,
bis(4-hydroxy-3,5-dichlorophenyl)methane,
bis(4-hydroxy-3,5-dibromophenyl)methane,
bis(4-hydroxy-3,5-difluorophenyl)methane,
bis(4-hydroxyphenyl)2,2-propane (common name—bisphenol A),
bis(3-chloro-4-hydroxyphenyl)-2,2-propane,
bis(4-hydroxy-3,5-dichlorophenyl)2,2-propane,
bis(4-hydroxynaphthyl)-2,2-propane,
bis(4-hydroxyphenyl)phenylmethane,
bis(4-hydroxyphenyl)diphenyl-methane,
bis(4-hydroxyphenyl)4'-methylphenylmethane,
bis(4-hydroxyphenyl)4'-chlorophenylmethane,
bis(4-hydroxyphenyl)-2,2,2-trichloro1,1,2-ethane,
bis(4-hydroxyphenyl)-1,1-cyclohexane,
bis(4-hydroxyphenyl)cyclohexylmethane, 4,4'-dihydroxydiphenyl, 2,2'-dihydroxydiphenyl,
   dihydroxynaphthalenes,
bis(4-hydroxyphenyl)-2,2-butane,
bis(2,6-dichloro-4-hydroxyphenyl)-2,2-propane,
bis(2-methyl-4-hydroxyphenyl)-2,2-propane,
bis(3-methyl-4-hydroxyphenyl)-1,1-cyclohexane,
bis(2-hydroxy-4-methylphenyl)-1,1-butane,
bis(2-hydroxy-4-tertbutylphenyl)2,2-propane,
bis(4-hydroxyphenyl)-1-phenyl-1,1-ethane,
4,4'-dihydroxy-3-methyl diphenyl-2,2-propane, and 4,4'-dihydroxy-3-methyl-3'-isopropyldiphenyl-2,2-butane.

In addition to the above recited para hydroxy bisphenols, the corresponding ortho and meta hydroxy bisphenols can be employed in the process of this invention.

Suitable dicarboxylic acid halides for the reaction are those acid halides of the formula:

wherein Z is a bivalent or disubstituted radical selected from the group consisting of alkylene, arylene, diarylene ether, cycloalkylene, alkylarylene; and X is halogen and $d$ is from 0 to 1. Particularly well suited to this invention are those halides wherein the halogen is chlorine or bromine.

It will be seen that oxalyl chloride is a special case of the above formula where Z has been omitted. The Z substituents preferably contain 1 to 20 carbon atoms. Additionally, mixtures of the above described dicarboxylic acid halides may be employed to achieve a polymer with especially desired properties.

Among the diacid halides of dicarboxylic acids which can be used according to the invention are oxalyl chloride, terephthaloylchloride, isophthaloylchloride, sebacoylchloride, adipoylchloride, 4,4'-diphenylether dicarboxylic acid chloride, (4,4' - dihydroxydiphenyl-2,2'-propane)-bischloroformate, ethyleneglycolbischloroformate, and fumaryl chloride.

The third constituent of the polymers of this invention is a reactive difunctional aliphatic modifier. The difunctional aliphatic modifiers suitable for use in this invention may be represented by the formula

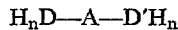

wherein D and D' are independently selected from the group consisting of O, S, and N; A is a bivalent aliphatic radical, free of tertiary carbon atoms, selected from the group consisting of aliphatic, cycloaliphatic, haloaliphatic, cyclohaloaliphatic, and aryl substituted aliphatic; and $n$ is from 1 to 2, being 2 when the respective D or D' is N. The suitable A substituents contain 2 to 20 carbon atoms and preferably 2 to 10 atoms when A is free of aryl substituents. Among the compounds suitable for this purpose as modifiers in the present reaction and product are ethylene glycol, ethanedithiol, diethylene glycol, ethanolamine, neopentyl glycol, methylethanolamine, 1,4-cycohexanedimethanol, hexamethylenediamine, 1,4 - butanedithiol, 2,2-bis(chloromethyl)-1,3-propane diol, 1,3-propane diol, 1,1 - isopropylidene bis(p-phenyleneoxy)di - 2 - ethanol, di-propylene glycol, 2 - mercaptoethanol, 2,2,4,4 - tetramethyl-1,3-cyclobutane diol, polypropylene glycol, (bis(4-hydroxycyclohexane)-2,2-propane, and 1,4-butane diol.

The amount of difunctional aliphatic modifier used in preparing the polyester of this invention depends upon the polymer properties desired. Although the change in properties effected by the incorporation of the difunctional aliphatic modifier into the homopolymer is dependent to an extent upon the structure of the modifier employed, increasing amounts of difunctional aliphatic modifier generally result in a decrease in the melt viscosity and glass transition point of the polymer. These properties can be varied within a wide range, dependent upon the kind and quantity of the difunctional aliphatic modifier incorporated into the polymer chain. Of course, combinations of aliphatic modifiers can be used too, usually to obtain special properties. The amount of difunctional aliphatic modifier used to modify the polymer may be as much as 85 mole percent of the diacid halide used to prepare the polymer. Generally very substantial modification of the original polymer can be effected by incorporation of about 30 to 60 mole percent of difunctional aliphatic modifier and improved polymers can be prepared by use of as little as 10 mole percent of this modifier.

According to the process of this invention the diacid halide and difunctional aliphatic modifier are reacted together at temperatures from about 20 to about 130 degrees centigrade. The reaction is complete when evolution of hydrogen halide is substantially ended. Thereafter, the bisphenol is charged to the reaction vessel and combined with the previous reaction product with rapid stirring. When the polymerization is completed, the polymer is ready for fabrication into useful articles.

The polycondensation is carried out at temperatures between about 50 degrees and 250 degrees centigrade. Preferably the initial temperature is sufficient to partially melt the prepolymer and thereafter the temperature is gradually increased so that the evolved hydrogen halide gas is freed from the reaction product. Suitable thermal schedules include initial temperatures of about 100 degrees centigrade and over a period of about three hours gradually increasing the temperature to about 175 degrees centigrade. This allows the bisphenol to polymerize, which occurs at about or below 175 degrees centigrade. At this juncture the reaction mixture viscosity has increased considerably. The reaction mixture is then held at about 200 degrees until there has been an additional increase in product viscosity. Finally the temperature is raised to 230 degrees centigrade or higher and maintained there until all of the hydrogen halide gas formed by the polymerization reaction has been liberated from the resultant polymer, which might take about twenty hours. The resulting polymer has an intrinsic viscosity of about 0.5 to 1.0 dl./g. or more at 30 degrees centigrade in sym-tetrachloroethane.

Another aspect of this invention is the use of vacuum during the terminal portion of polymerization to aid in the removal of the hydrogen halide by-product of the polymerization reaction. Such vacuum, from about 0.1 to 30 inches of mercury absolute pressure, can be applied to a static system too viscous to stir in ordinary kettle type equipment or it may be applied to a vented extruder designed to stir such highly viscous masses. After the polymerization has progressed to a point where the intrinsic viscosity of the product is 0.1 to 0.24 dl./g. in sym-tetrachloroethane at 30 degrees centigrade, the kettle polymerization reaction can be terminated by cooling the polymer mass, after which the polymer can be transferred to a vented extruder. The low molecular weight polymer can then be extruded under such conditions of vacuum, residence time and temperature so that the resulting extrudate has an intrinsic viscosity (in sym-tetrachloroethane at 30 degrees centigrade) of 0.5 to 1.0 dl./g. or greater. Suitable temperatures employed in this technique range from 200 to 325 degrees C. and vacuums of 15 torr, i.e. 15 millimeters of mercury, or less are satisfactory.

It is an important advantage of the present invention that the reaction can be carried out at atmospheric or lower pressures. Additionally, the process proceeds to completion at a faster rate than other processes by which the polymers of this invention might be made.

High boiling aromatic solvents have been found to be useful, although optional, for the reaction of the prepolymer and bisphenol. Satisfactory polymers are produced when no solvents are employed. However, solvents may be desirable to facilitate handling of the polymer, depending upon reaction vessels used for preparation of the polymer. The choice of solvent is usually best determined from consideration of the solubility of the polymer in solvent, the boiling point of the solvent and stability of the solvent. Among the most useful solvents for this process are partially chlorinated bisphenyls, biphenyl, biphenyl oxides, eutectic mixtures of biphenyl and biphenyl oxide and trichlorobenzene. The polymer can be separated from the solvent by precipitation with an anti-solvent, filtering and then drying. Suitable anti-solvents include solvents such as aliphatic alcohols, e.g., methanol and ketones, e.g., acetone. Preferably the polymer is then dried in an inert atmosphere.

The color and clarity of the compositions of this invention are improved by excluding oxygen from the reaction vessel. Upon even slight oxidation, phenols and bisphenols discolor to a deep red. Since pronounced colors are hard to mask, to be most useful the polymer should be colorless or nearly colorless. Therefore, an inert gas is employed to exclude oxygen from the reaction vessel. While it has been convenient to use nitrogen, any suitable inert gas or mixture may be used.

Optionally, small amounts of adjuvants or modifiers may be admixed with the polymers produced by the process of this invention so that more useful articles may be obtained. Thus, dyes and pigments for different colors, waxes, silicones and stearates for mold flow and mold release, and inert fillers may be added to modify physical properties.

The melt viscosity of the polymers of the invention does not generally exceed 500,000 poises at 300 degrees centigrade, and preferably does not exceed about 100,000 poises as measured by American Society for Testing Materials (ASTM) Procedure D–1238–57T. Preferably, the melt viscosity is less than 50,000 poises.

Because the polymers of the invention are thermoplastic, they can be made into useful articles by applying fabrication techniques known in the art such as compression or injection molding, vacuum forming, extrusion, solvent coating and fiber spinning. The actual times, pressures and temperatures of fabrication are dependent upon the method of making, and the size and shape of the article.

The practice of this invention is illustrated but not limited by the examples given below. Unless otherwise noted temperature is expressed in degrees centigrade and parts are parts by weight.

EXAMPLE 1

Into a reaction vessel equipped with an inert gas inlet, a sealed stirrer and a water cooled condenser were charged 5.08 parts of isophthaloyl chloride and 0.824 part of diethylene glycol. The reactants were heated on a steam bath for two hours while padded, i.e. blanketed, with a flow of anhydrous nitrogen. The reaction mixture was allowed to cool and 3.95 parts of bisphenol A were added, together with sufficient partially chlorinated biphenyl (Arochlor 1248, Monsanto Chemical Corporation, St. Louis, Mo.) specific gravity 1.452, to make a 10 percent by weight final polymer solution. The reaction was then heated by means of an oil bath, for 1 hour at 100 to 125 degrees, then 1 hour at 125 to 160 degrees, then a half hour at 160 to 180 degrees, then 1 hour at 180 to 210 degrees, then a half hour at 210 to 230 degrees and 17.5 hours at 230 degrees. The reaction mixture was then cooled and diluted with sufficient methylene chloride to make it fluid. The polymer was recovered by precipitating with 3 volumes of acetone, was further washed with acetone and was vaccum (7 mm. of mercury) dried at 70 degrees in anhydrous nitrogen gas. The product was a 30 mole percent diethylene glycol modified bisphenol A polyisophthalate. Polymer yield was 86.2 percent and the polymer had an intrinsic viscosity of 1.08, when measured in symmetrical tetrachloroethane at 30 degrees.

EXAMPLE 2

Using the procedure of Example 1, a prepolymer was prepared by reacting 50.20 parts of terephthaloyl chloride with 10.31 parts of neopentyl glycol. To the prepolymer were added 33.85 parts of bisphenol A and 101.9 parts of Arochlor 1248 to make a 30 percent by weight final polymer solution. A 40 mole percent neopentyl glycol modified bisphenol A polyterephthalate of intrinsic viscosity of 0.75 was obtained, with a conversion of 95 percent.

EXAMPLE 3

Using the procedure of Example 1 a polymer was prepared by reacting 62.42 parts of terephthaloyl chloride with 12.43 parts of neopentyl glycol. To the prepolymer were added 40.05 parts of bisphenol A and 95 parts of Arochlor 1248 to make a 50 percent by weight final polymer solution. A 40 mole percent neopentyl glycol modified bisphenol A polyterephthalate was made at a conversion of 86.5 percent, and had an intrinsic viscosity of 0.87.

EXAMPLE 4

Using the procedure of Example 1 a polymer was prepared by reacting 25.41 parts of terephthaloyl chloride with 5.21 parts of neopentyl glycol. To the reaction were added 17.12 parts of bisphenol A and 91.6 parts of trichlorobenzene. A conversion of 97.2 percent to a 40 mole percent neopentyl glycol modified bisphenol A polyterephthalate, with an intrinsic viscosity of 0.91, was obtained.

EXAMPLE 5

Using the general procedure of Example 1 a prepolymer was prepared by reacting 658.1 parts of terephthaloyl chloride with 134.9 parts of neopentyl glycol. Bisphenol A (443.3 parts) was reacted with the prepolymer while heating for 1.5 hours at 90 to 110 degrees, 0.9 hour at 110 to 130 degrees and finally, 0.9 hour at 130 to 225 degrees (heat increase at rate of 2 degrees per minute). The product was a 40 mole percent neopentyl glycol modified bisphenol A polyterephthalate with an intrinsic viscosity of 0.48.

EXAMPLE 6

Into a reaction vessel equipped with an inert gas inlet, a sealed stirrer and a water cooled condenser were charged 239.7 parts of terephthaloyl chloride and 61.5 parts of neopentyl glycol. The reactants were heated on a steam bath for two hours while under a protective layer of nitrogen. The hydrogen chloride evolved and recovered was 93.6 percent of theory. To the molten prepolymer were added 134.5 parts of bisphenol A. Over a period of 70 minutes the vessel was gently heated by means of a circulating oil bath, starting at 120 degrees and slowly rising to 220 degrees. At this temperature the mass was too viscous to stir by conventional means. The nitrogen flow was discontinued and a vacuum was applied. Hydrogen chloride gas recovered during this period was 86.2 percent of theory.

The polymer mass was heated under vacuum at 250 degrees centigrade, during which time the pressure was reduced from about 2 millimeters of mercury to 0.05 millimeter of mercury. The polymer was recovered from the reaction vessel without the necessity for dissolving and precipitating. The cooled mass was cut into small pellets, suitable for direct molding. Average intrinsic viscosity of this polymer was 0.91 when measured in symmetrical tetrachloroethane at 30 degrees centigrade.

EXAMPLE 7

Using the procedure of Example 6, a polymer was prepared by reacting 658.1 parts of terephthaloyl chloride and 134.9 parts of neopentyl glycol for two hours heated with a steam bath, then 443.3 parts of bisphenol A were added and the mixture was heated for 85 minutes with an oil bath. The reaction was then discontinued. The amount of hydrogen chloride recovered was 90.1 percent of theory. The polymer had an intrinsic viscosity of 0.41 dl./g. in sym-tetrachloroethane at 30 degrees.

Two other polymers prepared in the same manner had intrinsic viscosities of 0.34 dl./g. and 0.38 dl./g.

The above three polymers were individually ground to a size which was retained on a 20 mesh sieve, U.S. Standard Sieve series, and the particles were dry blended to a uniform mass. The polymer blend was then extruded in a twin screw vented extruder heated to a temperature range of 270 to 285 degrees, residence time being approximately 7 minutes and a vacuum of about 8 torr being employed. The resulting extrudate had an intrinsic viscosity of 0.85 and was suitable for molding into useful articles such as covers, containers, knobs and household and industrial objects.

Various changes and modifications may be made in the method of this invention, and in the mole ratios of the polymers of this invention, certain preferred ones of which have been herein described, without departing from the spirit and scope of this invention. Such modifications and substitution with equivalent elements are regarded as within the scope of the invention.

What is claimed is:

1. A process for preparing a thermoplastic polymer, having an intrinsic viscosity of at least 0.4 deciliter/gram when measured in symmetrical tetrachloroethane at 30 degrees centigrade, of components consisting essentially of (1) a polyester prepolymer of components consisting essentially of (a) an organic diacid halide and (b) a difunctional aliphatic modifier of the formula $$H_nD\text{---}A\text{---}D'H_n$$

wherein D and D' are independently selected from the group consisting of O, S, and N; A is a bivalent radical free of tertiary carbon atoms and selected from the group consisting of aliphatic, cycloaliphatic, haloaliphatic, cyclohaloaliphatic and aryl substituted aliphatic; and $n$ is an integer from 1 to 2, with $n$ being 2 when D or D' is N; and (2) a bisphenol, said process consisting essentially of:
 (A) reacting components consisting essentially of said organic diacid halide and said difunctional aliphatic modifier anhydrously and until the evolution of hydrogen halide has substantially ended to produce said polyester prepolymer, and
 (B) reacting components consisting essentially of said polyester prepolymer and said bisphenol anhydrously and at an elevated temperature until the hydrogen halide gas formed by the reaction has been liberated from said polymer; said modifier employed in a proportion from 10 to 85 mole percent of said diacid halide, and said bisphenol employed in sufficient proportion that the total molar proportion of aliphatic modifier and bisphenol approximately equals the molar proportion of diacid halide in the polymer.

2. The process according to claim 1 wherein the organic diacid halide has the formula $XOCZ_dCOX$ wherein Z is a radical selected from the group consisting of alkylene, arylene, diarylene ether, cycloalkylene and alkylarylene, X is halogen and $d$ is from 0 to 1; and wherein the process steps (A) and (B) are conducted in an inert atmosphere.

3. A process according to claim 1 wherein said polyester prepolymer is prepared at a temperature of about 20 to about 130 degrees centigrade.

4. A process according to claim 1 wherein said polyester prepolymer and bisphenol are reacted at a temperature from about 50 to about 250 degrees centigrade.

5. A process according to claim 1 wherein process steps (A) and (B) are effected in an inert atmosphere, and a high boiling aromatic solvent is present in process step (B).

6. A process according to claim 5 wherein said polymer is recovered by precipitating said polymer from solution by addition of an anti-solvent and separating the precipitate from the solvent.

7. A process for preparing a thermoplastic polymer, having an intrinsic viscosity of at least 0.4 deciliter/gram when measured in symmetrical tetrachloroethane at 30 degrees centigrade, of components consisting essentially of (1) a polyester prepolymer of components consisting essentially of (a) an organic diacid halide and (b) a difunctional aliphatic modifier of the formula $$H_nD\text{---}A\text{---}D'H_n$$

wherein D and D' are independently selected from the group consisting of O, S, and N; A is a bivalent radical free of tertiary carbon atoms and selected from the group consisting of aliphatic, cycloaliphatic, haloaliphatic, cyclohaloaliphatic and aryl substituted aliphatic; and $n$ is an integer from 1 to 2, with $n$ being 2 when D or D' is N; and (2) a bisphenol, said process consisting essentially of:
 (A) reacting components consisting essentially of said organic diacid halide and said difunctional aliphatic modifier anhydrously and until the evolution of hydrogen halide has substantially ended to produce said polyester prepolymer;
 (B) anhydrously reacting components consisting essentially of said polyester prepolymer and said bisphenol at an elevated temperature until a low molecular weight polymer is produced; and
 (C) heating said low molecular weight polymer under vacuum until a polymer of said intrinsic viscosity is obtained; said aliphatic modifier employed in a proportion from 10 to 85 mole percent of said diacid halide, and said bisphenol employed in sufficient proportion that the total molar proportion of aliphatic modifier and bisphenol approximately equals a molar proportion of diacid halide in the polymer.

8. A process according to claim 7 wherein said polyester prepolymer is prepared at a temperature of about 20 to about 130 degrees centigrade.

9. A process according to claim 7 wherein said low molecular weight polymer is produced at a temperature of about 50 to about 250 degrees centigrade, and is thereafter heated under vacuum at a temperature from 200 to 325 degrees centigrade.

References Cited

UNITED STATES PATENTS

| 3,161,615 | 12/1964 | Goldberg | 260—47 |
| 3,398,120 | 8/1968 | Hindersinn. | |
| 3,272,774 | 9/1966 | Moyer. | |
| 3,207,814 | 9/1965 | Goldberg | 260—47 |

FOREIGN PATENTS

| 1,198,715 | 6/1959 | France. |

WILLIAM H. SHORT, Primary Examiner

L. P. QUAST, Assistant Examiner

U.S. Cl. X.R.

260—33.8, 49, 61, 75